Dec. 11, 1962  G. SWIFT  3,067,519
CABLE STRETCH CORRECTOR
Filed Oct. 15, 1959  3 Sheets-Sheet 1

INVENTOR.
GILBERT SWIFT
BY
Robert K. Schumacher
ATTORNEY

Dec. 11, 1962  G. SWIFT  3,067,519
CABLE STRETCH CORRECTOR
Filed Oct. 15, 1959  3 Sheets-Sheet 2

INVENTOR.
GILBERT SWIFT
BY
Robert R. Schumacher
ATTORNEY

Dec. 11, 1962 G. SWIFT 3,067,519
CABLE STRETCH CORRECTOR
Filed Oct. 15, 1959 3 Sheets-Sheet 3
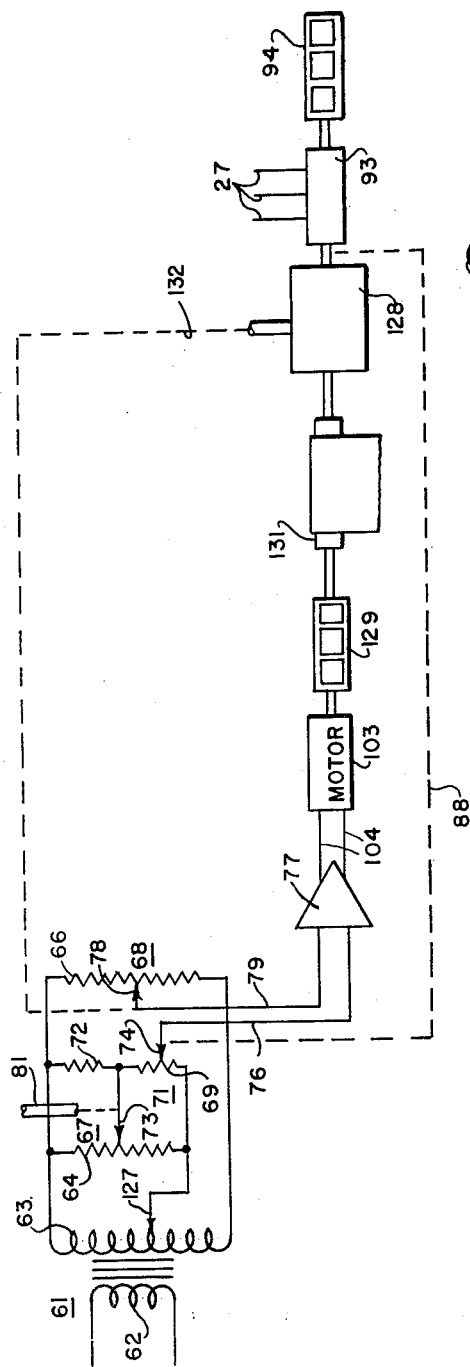
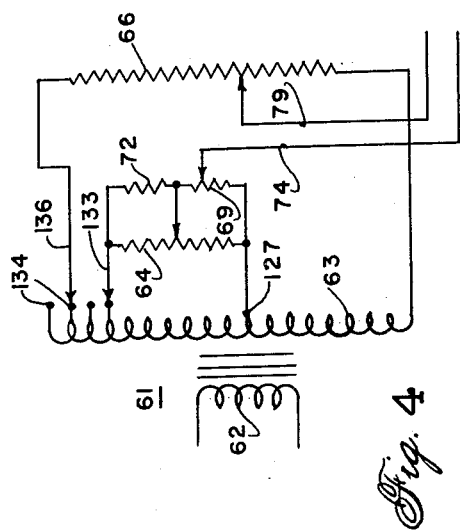
INVENTOR.
GILBERT SWIFT
BY
*Robert K. Schumacher*
ATTORNEY

United States Patent Office 3,067,519
Patented Dec. 11, 1962

3,067,519
CABLE STRETCH CORRECTOR
Gilbert Swift, Tulsa, Okla., assignor, by mesne assignments, to Dresser Industries, Inc., Dallas, Tex., a corporation of Delaware
Filed Oct. 15, 1959, Ser. No. 846,615
9 Claims. (Cl. 33—127)

The present invention relates to well logging apparatus and more particularly to apparatus for obtaining the true depth of penetration of a well logging tool in a well.

During logging a well, the logging apparatus is lowered into the well on the end of a cable. The depth of penetration of the tool in the well may be obtained by several means but the method with which the present invention is primarily concerned relates to measuring the length of cable supplied to the well by counting markers applied at regular intervals to unstretched cable. (Sometimes they are applied to uniformly stretched cable under tension, but preferably the cable is unstretched, i.e., uniformly stretched with no tension; uniform stretching includes uniform zero stretching.) Magnetic or visual markers may be applied to the cable and detectors are employed for generating a voltage pulse for each detected marker. A converter may be employed for producing rotation of a shaft as a function of the pulses counted, and if a chart recording system is employed to plot drilling or logging information against depth of penetration, the chart drive mechanism of a recorder may be connected to be driven directly from the shaft.

An accurate indication of the depth of penetration of a tool cannot be obtained by directly counting the markers since the weight of the apparatus on the well cable stretches the cable and the spacing between the markers is changed from the unstretched spacing. The true depth of penetration is now a function of the depth indicated by the number of markers counted; that is, the length of cable fed to the well, plus an increment equal to the elongation of the cable in the well due to the weight thereon plus its own weight.

It has been proposed to obtain a correction for effects of stretch of the cable on measurements of the depth of penetration of a well by measuring the stress on the cable and integrating tension with respect to incremental depth and depth with respect to incremental tension and taking the arithmetic mean of the two integrals to obtain a correction factor for the measured depth. And further, it has been suggested to apply these two measurements to rotate a differential synchro which electrically adds its rotation to the rotation of an uncorrected synchro to produce a shaft rotation essentially proportional to true depth. The above method of obtaining a true depth measurement is quite complicated and expensive and employs a considerable number of circuit elements, if an electrical system is employed, or mechanical elements, if a mechanical system is employed, the large number of elements reducing the accuracy and reliability of the system. Further, since it is necessary to apply these readings through a differential synchro in order to produce a rotation for driving the drive mechanism of a recorder, the torque available for driving the recorder is quite small and is below that required for reliable recorder chart drive.

In accordance with the present invention, correction of depth of penetration of a tool in a well is obtained by adding to a marker measurement of the cable fed to a well, a depth correction derived by taking the product of depth and tension. Where a chart is to be driven in accordance with true depth, apparatus is displaced by an amount proportional to the product of depth and tension and the displacement is added through a differential mechanism to the displacement of a second apparatus which is proportional to the uncorrected depth of penetration of the tool so as to obtain a corrected chart drive. Substantially no force or torque is lost in the differential mechanism and therefore approximately all of the force displacing the second apparatus is available for chart drive.

In one embodiment of the present invention, depth of penetration of the tool as determined by counting markers is corrected by means of a differential gear mechanism to which a first rotation indicative of the number of markers counted is applied as one input and to which a correction proportional to depth times tension is applied as a second rotation. The tension of the cable in all embodiments of the invention is obtained by feeding the cable over a sheave which is suspended from a spring, the amount of extension of the spring being proportional to the tension in the well cable.

The depth of penetration times tension is obtained in a first embodiment from a wholly mechanical multiplying system. The depth of penetration, as determined by number of markers counted, and the cable tension are both converted to shaft rotations and applied to separate input shafts of the mechanical multiplier. The multiplier has an output shaft which is rotated in accordance with the product of the rotations of the input shafts. This latter shaft is connected to one input of the differential gear mechanism to insert the requisite correction into the system.

In a second embodiment of the present invention, rotations proportional to depth of penetration of the well and tensioning of the cable are converted to electrical quantities by means of potentiometers connected in an electrical multiplication circuit. In this circuit an output voltage is obtained proportional to the product of depth and tension and is applied to a servomotor which produces rotation of one input to a differential gear mechanism. A second input to the differential gear mechanism is obtained directly from a synchro mechanism which is rotated in accordance with marker determined length of cable supplied to the well. The output shaft of the differential gear is employed to drive a chart drive mechanism, and it is seen that the chart drive is driven substantially directly from a conventional synchro receiver rather than the differential synchro. The only losses suffered in the system are those of the differential gearing mechanism, which losses are slight.

In accordance with the third embodiment of the present invention, the chart drive mechanism is driven by means of a servomotor which obtains information from an electrical circuit including the multiplication circuit of the second embodiment of the invention. The electrical circuit further includes a rebalancing circuit which is driven from the output shaft of a differential gear mechanism, the two input shafts of which are rotated in proportion to readings of the corrected and uncorrected depths of penetration of the well.

It is an object of the present invention to provide a simple, economical and highly reliable apparatus for driving a chart drive mechanism in accordance with true depth of penetration in a well by a well survey apparatus.

It is another object of the present invention to provide a wholly mechanical system for driving a chart drive mechanism in accordance with the true depth of penetration in a well by well logging equipment.

It is another object of the present invention to provide a primarily electrical system for correcting the depth of penetration in the well by a well cable which correction is a function of depth of penetration and tension on the well cable.

It is still another object of the present invention to provide a chart drive mechanism for rotating the chart drive mechanism of a recorder an amount directly proportional to true depth of penetration in the well by a well logging apparatus, in which the product of depth of penetration and tension on the well cable is obtained directly and is employed as a correction factor for readings of the length of the cable fed to the well.

The above and still further objects, features and advantages of the present invention will become apparent upon consideration of the following detailed description of one specific embodiment thereof, especially when taken in conjunction with the accompanying drawings, wherein:

FIGURE 3 is a circuit diagram illustrating a modification of the circuit of FIGURE 2; and FIGURE 4 is a schematic circuit diagram illustrating a modification of the multiplication circuit of FIGURE 3.

Figure 1:
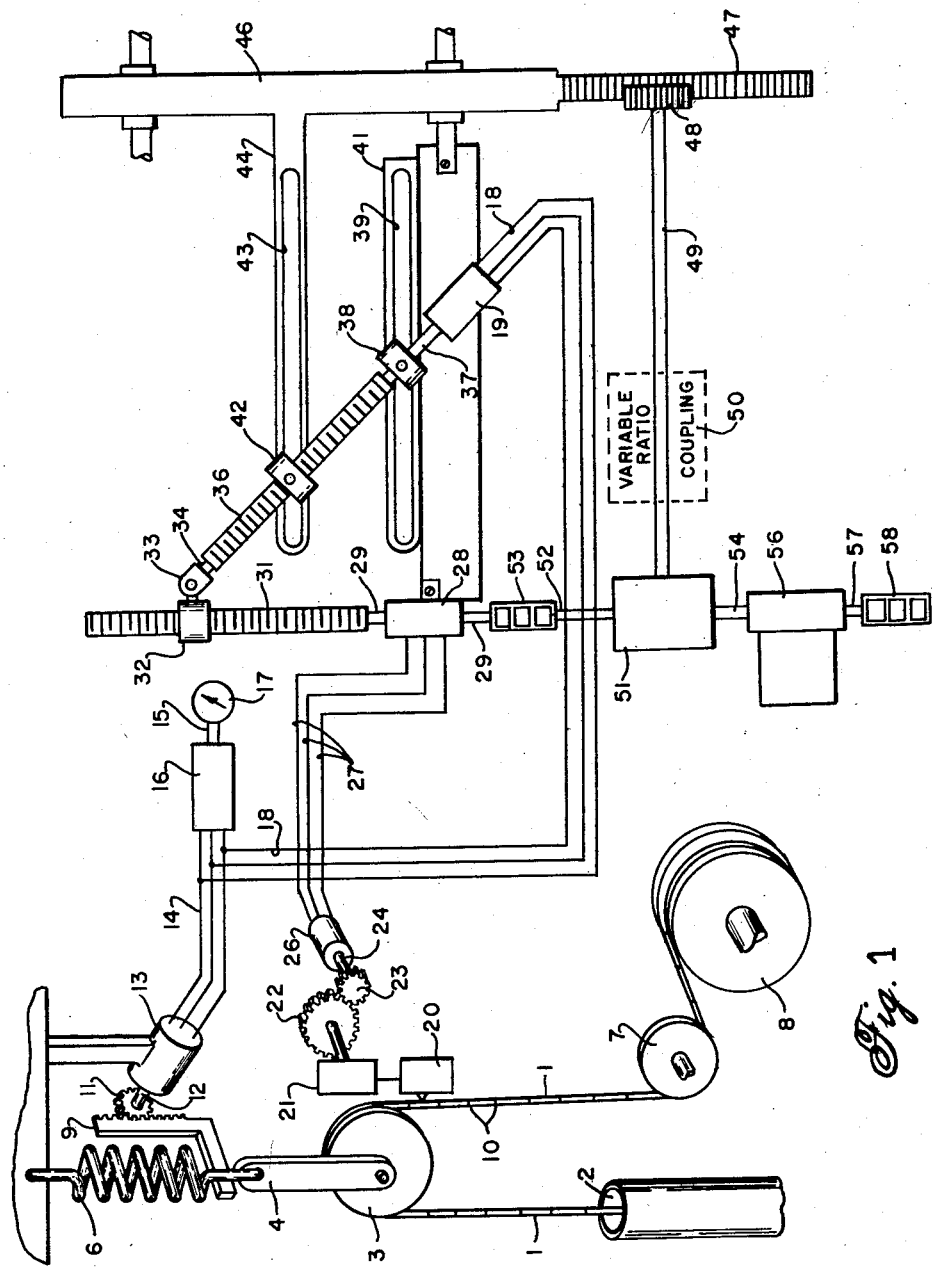
FIGURE 1 is a schematic diagram of a substantially wholly mechanical system for correcting depth of penetration measurements as a result of tensioning of the well cable.

Referring specifically to FIGURE 1 of the accompanying drawings, there is illustrated one embodiment of the apparatus of the present invention. A cable 1 which extends into a well 2 and is employed for supporting well surveying equipment is passed over a pulley or sheave 3. The sheave 3 is supported by means of a link 4 suspended from a stationary support by means of a spring 6. The cable 1 is passed under a further sheave 7 to a hoist drum 8 from which the cable 1 is payed out or on which it is wound. The drum 8 is driven by a suitable source of rotary motor power which is not illustrated. Connected to the lower end of the spring 6 immediately adjacent its connection to the link 4 or connected to the link 4 whichever is appropriate, is a rack 9 which meshes with a pinion 11 supported on the end of a shaft 12 of a suitable synchro or rotary electrical transmitter 13. The transmitter 13 is connected via three leads 14 to a rotary or synchro receiver 16 which drives a shaft 15 of a cable tension or weight indicator 17. The leads 14 are connected via further leads 18 to a second synchro or rotary receiver 19.

The cable 1 is provided with markers 10 having equal spacing therebetween when the cable is uniformly tensioned, including uniform zero tensioning. The markers 10 may be visual or magnetic and a suitable reader 20 is provided for producing a voltage pulse each time a marker 10 passes it. Voltage pulses developed by the reader 20 are converted to shaft rotation by converter 21 which may take the form of any one of a number of instruments employed in the art for such purposes such as a stepping motor. The converter 21 drives a first pinion 22 which engages a second pinion 23 connected via a shaft 24 to a further synchro transmitter 26. The transmitter 26 is connected via leads 27 to a synchro receiver 28, having a shaft 29 extending from both ends thereof. The upper end of shaft 29 as illustrated in FIGURE 1 is connected to a lead screw 31 which carries a nut 32. The nut 32 engages the threads on the lead screw 31 and is adapted to move vertically as illustrated in FIGURE 1, along the threads thereof. The nut 32 is pivotally connected to a member 33 which rotatably receives a shaft 34 supported on the upper end of a second lead screw 36. The other end of screw 36 is connected to a shaft 37 of the synchro receiver 19. The shaft 37 has rotatably supported thereon a collar 38 slidably received in a horizontal slot 39 of a stationary guide 41, the slot 39 and guide 41 extending perpendicular to the lead screw 31. The lead screw 36 is provided with a travelling nut 42 which moves along the length of the lead screw 36 in response to rotation thereof and is slidably received in a horizontal slot 43 in arm 44 extending parallel to the guide 41. The lead screws 31 and 36, nuts 32 and 42, guide 41 and arm 44 constitute a mechanical multiplier in which the vertical movement of arm 44 is proportional to the product of the rotations of shafts 31 and 36.

The arm 44 is secured to a vertically extending arm 46 as viewed in FIGURE 1 which is appropriately guided for vertical movement only. The lower end of the member 46, as viewed in FIGURE 1, is provided with a rack gear 47 which meshes with a pinion gear 48 connected via a shaft 49, rotatable with the pinion 48, to a differential gearing mechanism 51. A change gear mechanism 50 may be inserted in the shaft 49 as indicated by the dashed lines. The shaft 49 constitutes one of two shafts supplying rotary motion to the gears of the differential gearing mechanism 51. The other input shaft to the differential gearing mechanism 51 is a shaft 52 which is driven by the shaft 29 of the synchro receiver 28 through the driven shaft of an odometer 53. The differential gearing mechanism is provided with an output shaft 54 for driving a chart take-up drum 56 and a shaft 57 of a further odometer 58.

In operation, the extension of the spring 6 may be made to be directly proportional to the tension in the cable 1, and the movement of the rack 9 relative to the pinion 11 is a direct function of the tension in the cable 1 and therefore of the incremental elongation thereof. The movement of the rack 9 relative to the pinion 11 is transmitted electrically via the leads 14 to the synchro receiver 16 which causes its armature and its output shaft 15 to rotate through a number of degrees equal to the number of degrees of rotation of the shaft 12. The meter or indicator 17 may be calibrated in weight or tension on the cable 1 for direct reading. The information on the leads 14 is also provided via the leads 18 to the synchro receiver 19.

The synchro transmitter 26 connected via the shaft 24 and pinions 22 and 23 to the converter 21 produces electrical signals on the leads 27 proportional to the uncorrected length of cable 1 fed into the well 2. The signals developed on the leads 27 are applied to the synchro receiver 28 which rotates the lead screw 31 a number of revolutions equal to the number of revolutions of the input shaft 24 of the synchro transmitter 26. In consequence of this rotation, the travelling nut 32 is raised or lowered along the lead screw 31 and moves the member 33 accordingly; that is, to the same extent. Movement of the member 33 causes the slide 38 to move along the guide 41 to an extent determined by the motion of the screw 31. Concurrently, the rotation of the synchro receiver 19 in accordance with tensioning of the spring 6 is imparted to the lead screw 36 which in turn causes movement along the screw of the nut 42. Movement of the nut 42 is therefore effected by translatory movement of the nut 32 as a result of rotation of screw 31 and also by rotation of screw 36 and, as a consequence, the vertical displacement of the nut 42 is directly proportional to the product of the tension of the cable 1 and the length of cable 1 fed to the well 2.

The vertical movement of the nut 42 is imparted to the arm 44 which in turn imparts corresponding movement to the vertical member 46. Vertical movement of the member 46 is applied via the rack gear 47 and pinion 48 to one input of the differential gearing mechanism 51, the other input to the differential gearing 51 being via the shaft 52 whose rotation is indicative of the depth of the tool connected to the cable 1 as obtained from the synchro 26. The rotation of the output shaft 54 of the mechanism 51 is the sum of the rotations of the shafts 49 and 52 and is proportional to the sum of the marker measured length of cable fed to the well and the correction derived from the multiplier. Therefore, the chart drum 56 is driven in accordance with the true depth of the tool in the well and all recordings made thereon are correctly correlated with true depth rather than the ostensible depth as determined from the synchro 26. The true depth in the well is directly indicated by the odometer 58 and the difference between the true depth and ostensible depth is indicated by the difference between the readings of the odometers 53 and 58. It will be noted that the only mechanism interposed between the synchro receiver 28 and the chart drum 56 are the odometer 53 and the differential gearing mechanism 51. Both of these mechanisms require very little driving power and therefore, substantially none of the driving power received or developed by the synchro receiver 28 is dissipated in the correction mechanism of the apparatus, so that no difficulty is encountered in the developing of enough force to drive the chart take-up drum 56.

It will be noted that in the apparatus of FIGURE 1, two synchro receivers are employed in the tension measuring apparatus, namely, the synchro receivers 16 and 19. It is apparent that a single synchro receiver of the type employed for the receiver 28 may be employed, that is, one having an output shaft from both ends of the device and therefore one capable of driving both the lead screw 36 and the shaft 15 of the indicator 17. In such an apparatus, the single synchro receiver may be employed with the transmitter 13 rather than two receivers as illustrated in the figure.

Figure 2:
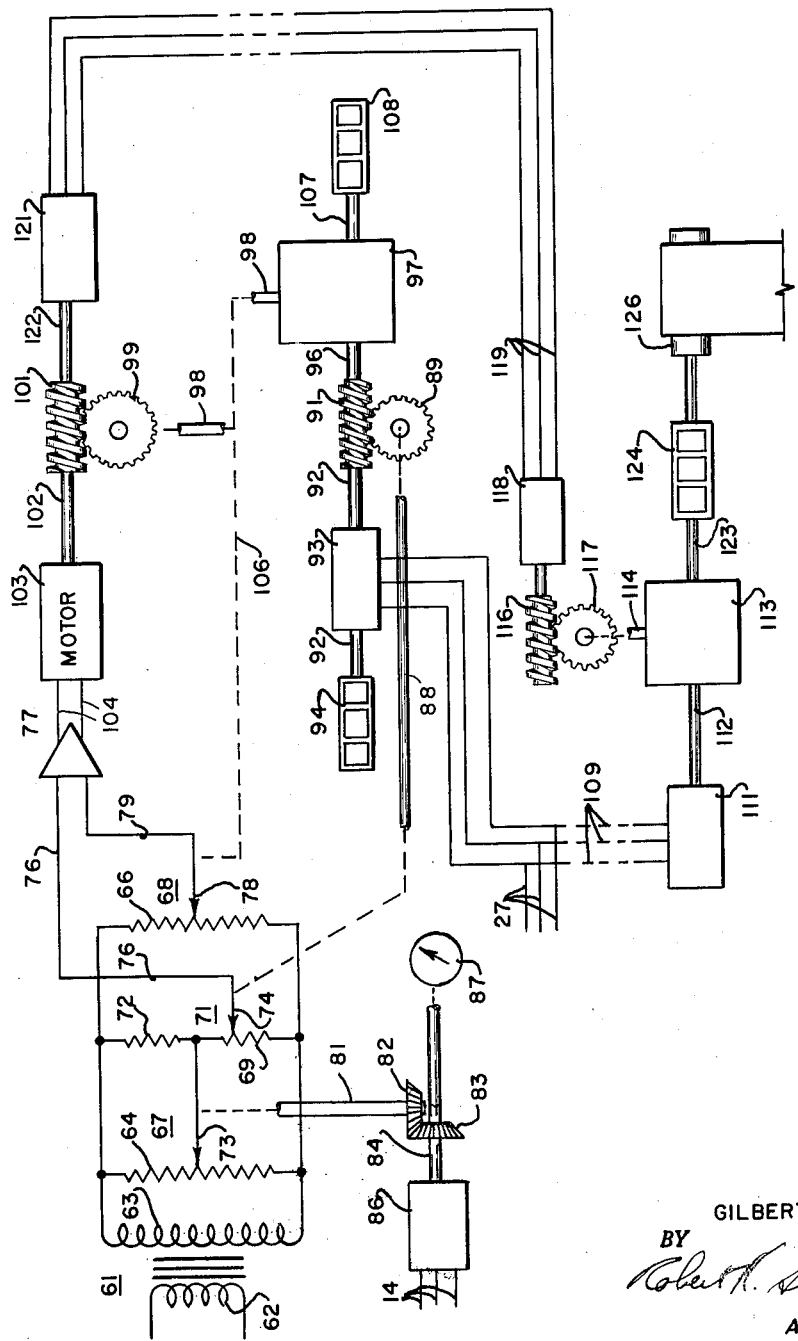
FIGURE 2 is a partial schematic circuit electrical wiring diagram and mechanical diagram of an apparatus for correcting depth of penetration measurements for well logging purposes.

In accordance with FIGURE 2 of the accompanying drawings there is illustrated an electrical correction mechanism which may be readily employed with the well logging or drilling apparatus illustrated in FIGURE 1. In FIGURE 2 the specific well equipment is omitted and the connection between the correction apparatus and the well logging equipment is shown by means of the leads 14 and 27 from the transmitters 13 and 26 respectively.

Referring now specifically to FIGURE 2 which is a partial electric wiring and partial mechanical schematic diagram, there is provided a transformer 61 having a primary winding 62, connected to a suitable source of alternating current, and a secondary winding 63. Resistors 64 and 66 of potentiometers 67 and 68, respectively, are connected across the secondary winding 63 and a resistance 69 of potentiometer 71 is connected in series with a compensating resistor 72 across the secondary winding 63. The potentiometer 67 is provided with a slider 73 connected to the junction of the resistors 69 and 72 and the potentiometer 71 is provided wtih a slider 74 connected via a lead 76 to an input terminal of an amplifier 77. The potentiometer 68 is provided with a slider 78 which is connected via a lead 79 to a second input terminal of the amplifier 77. The slider 73 of the potentiometer 67 is mechanically connected via a shaft 81 to a miter gear 82 which meshes with a further miter gear 83. The miter gear 83 is connected to a rotatable shaft 84 of a synchro receiver 86. The synchro receiver 86 is electrically connected via leads 14 to the synchro transmitter 13 of FIGURE 1 and therefore indicates the weight or tension on the cable 1, the weight or tension being indicated by the meter 87 of FIGURE 2. The slider 74 of the potentiometer 71 is connected via a shaft 88 to a worm wheel 89 which is in mesh with a worm 91. The worm 91 is driven by a shaft 92 of a synchro receiver 93 connected via the leads 27 to receive electrical information from the synchro transmitter 26 of FIGURE 1. Thus, the synchro receiver 93 rotates its shaft 92 in accordance with the uncorrected depth of the well tool or more specifically the amount of unstretched cable 1 fed to the well. The shaft 92 of the synchro receiver 93 is also connected to an odometer 94 which indicates the uncorrected depth of the tool. The worm 91 has connected thereto a shaft 96 for rotation therewith and the shaft 96 provides one input shaft to a differential gear mechanism 97. The differential gear mechanism 97 is provided with a second input shaft 98 driven by means of a worm wheel 99 which engages a second worm 101. The worm 101 is driven by an output shaft 102 of a servomotor 103 which is energized via leads 104 from the amplifier 77.

It is apparent from the above discussion that the slider 73 of the potentiometer 67 is moved along its associated resistance 64 to a position indicative of the weight of the apparatus suspended from the cable 1 while the position of the slider 74 of the potentiometer 71 is indicative of the uncorrected depth of penetration of the well. The electrical circuit illustrated, that is, the circuit including the elements 61 through 78 is a well-known electrical analog multiplication circuit and the voltage appearing on the lead 76 is directly proportional to the product of the depth of penetration of the tool and the tension on the cable 1. The system is a rebalancing servomotor system and the rotation of the motor 103 is fed back to the system via a coupling 106 between the slider 78 and shaft 98. Movement of the slider 78 effects electrical rebalancing of the system so that the motor 103 rotates only until the voltage between the leads 76 and 79 is reduced to zero or in a continuously varying situation rotates at a rate and in a direction to minimize the voltage across the leads 76 and 79. Consequently, the motor 103 rotates to an extent indicative of the product of the depth and tension and provides the necessary corrective second input motion, via the shaft 98, to the differential mechanism 97. The input motion to the differential mechanism 97 via the shaft 96 is proportional to the uncorrected depth of penetration of the tool and therefore, a motion is imparted to an output shaft 107 of the differential gear mechanism 97 indicative of the corrected depth of penetration of the well. This rotary motion is applied to a second odometer 108, which indicates the corrected depth of penetration, while the odometer 94 indicates the uncorrected depth of penetration. As in FIGURE 1, the take-up drum of a chart recorder may be driven directly from the output shaft 107 of the differential gear mechanism 97 or a remote recording arrangement may be employed as illustrated in FIGURE 2.

Referring again specifically to the diagram of FIGURE 2, the leads 27 which carry information relating to the uncorrected depth of penetration are connected via a further set of three leads 109 to a second synchro receiver 111. The receiver 111 has an output shaft 112 which provides one input motion to a differential gear mechanism 113. The mechanism 113 receives a second input motion via a shaft 114 which is driven from a worm 116 via a worm wheel 117. The worm 116 is driven by a synchro receiver 118 which receives positional information via leads 119 from a synchro transmitter 121. The synchro transmitter is driven by a shaft 122 connected to the worm 101 driven by the motor 103.

The rotational information applied to the differential gear 113 therefore is the same as the information applied to the differential gear 97 since the synchro 111 receives the same information as the synchro 93 and the input shaft 114 is subjected to the same rotation as the input shaft 98 to the differential gear 97 as a result of the electrical coupling between the synchros 121 and 118. Thus, the rotation of an output shaft 123 of the differential gear 113 is the same as on the output shaft 107 of the differential gear 97. The output shaft is coupled to an odometer 124 and to a take-up drum 126 of a chart recorder. Thus, the paper on which the record of well logging information is made is driven in direct proportion to the amount of movement of the well logging equipment in the well.

It can be seen from both of the mechanisms illustrated in FIGURES 1 and 2 that the torque of the synchro receiver is transmitted directly to the odometers and chart drives substantially undiminished in magnitude and whatever slight loss of torque occurs in the differential gear is substantially negligible. However, the torque available from synchro receivers is never very great in more conventional size synchros. Therefore, in accordance with a third embodiment of the present invention, a servomotor may be employed to power the chart drive mechanism. The electrical multiplication circuit illustrated in FIGURE 3 is identical with that illustrated in FIGURE 2 except that the secondary winding 63 of the transformer 61 has been provided with tap 127 to which the lower ends, as viewed in FIGURES 2 and 3, of the resistors 64 and 69 are connected while the lower end of the resistor 66 is connected to the lower end of the winding 63, thus permitting slider 78 to go beyond null when either slider 73 or slider 74 is in its zero position. Sliders 74 and 78 are connected via leads 76 and 79 to the amplifier 77 and the amplifier 77 applies electrical control information to the motor 103 via leads 104. The slider 74 is still positioned via a link 88 by means of the synchro receiver 93 while the slider 73 is positioned via the link 81 by means of the receiver 86 which is not illustrated in FIGURE 3. The synchro receiver 93 applies one input motion to the differential gear mechanism 128 which receives a second input motion from the servomotor 103. The motor 103 drives an odometer 129 and also a drive mechanism 131 of a chart recorder. The output motion of the differential gear mechanism is coupled via linkage 132 to the slider 78 of the potentiometer 68.

As in FIGURE 2, the potentiometer 67 and 71 are arranged so as to provide a voltage on the slider 74 indicative of the product of marker measured penetration and the weight on the cable 1. The voltage on the lead 79 is developed from the slider 78 which is moved by the output of the differential gear 128 such as to tend to minimize the voltage across leads 76 and 79. In this system the rotation of the rotor of the synchro 93 is subtracted from the rotation of the motor 103 and since the shaft 132 must be rotated in proportion to the product of the depth and tension in order to minimize the voltage across leads 76 and 79, the motor must rotate an amount equal to the sum of the rotations of the synchro 93 and of the shaft 132. In consequence, the motor rotates the chart drive mechanism in accordance with the corrected depth. It is apparent that the chart drive torque is applied entirely by the servomotor 103 and that, by employing a proper motor, ample energy is available for driving the chart.

In order to accommodate various cables having widely differing stretch characteristics, it is necessary to provide a means for varying the factor of proportionality between the product of depth and tension and the amount of correction applied in response to the output indication of the multiplier. This feature may readily be applied to the mechanical system illustrated in FIGURE 1 by simply inserting the variable ratio drive 50 in the link 49 in FIGURE 1. The electrical systems of FIGURES 2 and 3 are even more easily altered to accommodate varying cable characteristics by providing a plurality of taps at the upper end of the secondary 63 and varying the relative tap positions of the upper end of the resistor 66 with respect to tap connection of the upper ends of the resistors 72 and 64. Such an arrangement is illustrated in FIGURE 4 wherein the transformer 61 is provided with a secondary winding 63 which may be provided with mid tap 127 to which the lower ends of the resistors 64 and 69 may be connected or the resistors 64 and 69 may have their lower ends connected as illustrated in FIGURE 2. The upper ends of the resistors 64 and 72 are connected to slider 133 adapted to engage any one of a plurality of taps 134 on the upper end of the transformer secondary winding 63. Similarly, the upper end of the resistor 66 is connected to a slider 136 which may be selectively positioned to engage any one of the taps 134. In consequence, the amount of correction corresponding to a given value of the product of depth and tension can be varied at will with respect to the voltage on the lead 79 and therefore can be varied to suit stretch characteristics of different cables.

The apparatus of the present invention has been described as applied to determining the depth of penetration of a well by surveying equipment. It is apparent, however, that the apparatus may be employed for determining the true length of any material wherein the material fed to the system is under a measurable tension. Further, although potentiometers are employed in the circuits of FIGURES 2 and 3 as mechanical to electrical transducers other conventional transducers may be employed. Also, the slider 73 of potentiometer 67 of FIGURES 2 and 3 may be driven directly by the tension measuring device and the synchro system eliminated. Specifically, if a rotary potentiometer is employed the slider may be rotated by the rack 9 and pinion 12 and if a linear potentiometer is employed the slider may be reciprocated directly by the link 4.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An apparatus for determining the true depth of penetration of a well by a cable stretched by tension comprising means for determining the unstretched length of cable fed to said well, a first movable member, means for moving said first movable member to an extent proportional to said unstretched length of cable, means for measuring the tension at the top of the well in said cable, a second movable member, means for moving said second movable member to an extent proportional to the measured tension in said cable, multiplying means for forming by direct multiplication the product of the movements of said first and second movable members, a third movable member, means for moving said third movable member to an extent proportional to said product, a fourth movable member and means for moving said fourth movable member to an extent equal to the sum of the movements of said first and said third movable members.

2. The combination according to claim 1 further comprising a chart drive mechanism and means for driving said chart drive mechanism by said fourth movable member.

3. An apparatus for driving a mechanism to an extent proportional to the true depth of penetration of a well by a cable stretched by tension comprising a first shaft, means for rotating said first shaft as a function of the unstretched length of cable fed to said well, means for determining the tension at the top of the well in said cable, a second shaft, multiplying means for rotating said second shaft to an extent proportional to the product of said unstretched length of cable and the determined tension therein, a differential gear mechanism having two input shafts and an output shaft and means for rotating said input shafts each in accordance with the rotation of a different one of said first and second shafts.

4. An apparatus for driving a mechanism to an extent proportional to the true depth of penetration of a well by a cable stretched by tension comprising a first synchro receiver having an output shaft, means for energizing said first receiver so as to rotate said output shaft as a function of the unstretched length of cable fed to said well, a second synchro receiver having an output shaft, means for energizing said second receiver so as to rotate its output shaft as a function of the tension at the top of the well of said cable, a first shaft, a resistive network responsive to the rotations of said output shafts for developing a voltage proportional to the product of the unstretched length of cable and the tension therein at the top of the well, means for rotating said first shaft to an extent proportional to said voltage, and means for adding the rotation of said first shaft to the rotation of the output shaft of said first receiver.

5. An apparatus for driving a mechanism to an extent proportional to the true depth of penetration of a well by a cable stretched by tension comprising a first synchro receiver having an output shaft, means for energizing said first receiver so as to rotate said shaft as a function of the unstretched length of cable fed to said well, a second synchro receiver having an output shaft, means for energizing said second receiver so as to rotate its shaft as a function of the tension at the top of the well of said cable, a first shaft, multiplying means responsive to the rotations of said output shafts for rotating said first shaft proportional to the product of the unstretched length of cable and the tension therein at the top of the well, a differential gear means for adding the rotation of said first shaft to the rotation of the output shaft of said first receiver, and means for varying the constant of proportionality between the product of unstretched length of cable and tension therein at the top of the well and the rotation of said first shaft.

6. An apparatus for driving a mechanism to an extent proportional to the true depth of penetration of a well by a cable stretched by tension, comprising a first synchro receiver having an output shaft, means for energizing said first receiver so as to rotate said shaft as a function of the unstretched length of cable fed to said well, a second synchro receiver having an output shaft, means for energizing said second receiver so as to rotate its shaft as a function of the tension at the top of the well of said cable, an electrical multiplying circuit having two electromechanical transducers for converting mechanical movements to input voltages which are functions of said movements, means for connecting each shaft of said receivers to a different one of said transducers, said multiplying circuit producing an output voltage which is a function of the product of said input voltages, a further shaft, a rebalancing circuit for producing a feedback voltage which is a function of the rotation of said further shaft, an electric motor, means for energizing said motor in accordance with the difference between said feedback voltage and said output voltage, and means including said motor for rotating said further shaft as a function of said product so as to tend to minimize the voltage applied to said motor.

7. An apparatus for driving a mechanism to an extent proportional to the true depth of penetration of a well by a cable stretched by tension comprising a first receiver, having an output shaft, means for energizing said first receiver so as to rotate its output shaft as a function of the unstretched length of cable fed to said well, a second receiver having an output shaft, means for energizing said second receiver so as to rotate its output shaft as a function of the tension at the top of the well of said cable, a first shaft, a mechanical multiplier having a pair of rotatable input shafts and a rotatable output shaft and means connecting each of said output shafts of said receivers to a different one of said input shafts, and means connecting said rotatable output shaft to said first shaft.

8. An apparatus for driving a mechanism to an extent proportional to the true depth of penetration of a well by a cable stretched by tension, comprising a first synchro receiver having an output shaft, means for energizing said first receiver so as to rotate said shaft as a function of the unstretched length of cable fed to said well, a second synchro receiver having an output shaft, means for energizing said second receiver so as to rotate its shaft as a function of the tension at the top of the well of said cable, an electrical multiplying circuit arranged and adapted to convert the movements of said shafts of said receivers respectively into two input voltages and in response thereto to produce an output voltage which is the product of said two input voltages, an electrical motor, and a feedback system interconnected to be energized by the output from said motor and said output shaft of said first receiver and in response thereto in conjunction with said output voltage of said circuit to energize said motor to an extent proportional to the sum of said unstretched length and the product of said length and said tension.

9. An apparatus for driving a mechanism to an extent proportional to the true depth of penetration of a well by a cable stretched by tension, comprising a first synchro receiver having an output shaft, means for energizing said first receiver so as to rotate said shaft as a function of the unstretched length of cable fed to said well, a second synchro receiver having an output shaft, means for energizing said second receiver so as to rotate its shaft as a function of the tension at the top of the well of said cable, an electrical multiplying circuit having two electromechanical transducers for converting mechanial movements to input voltages which are functions of said movements, means for connecting each shaft of said receivers to a different one of said transducers, said multiplying circuit producing an output voltage which is a function of the product of said input voltages, an electrical motor having an output shaft, a rebalancing circuit interconnected with said output shaft of said electrical motor and adapted to produce a feedback voltage which is a function of the rotation of said output shaft of said electric motor, means for energizing said motor in accordance with the difference between said feedback voltage and said output voltage, a differential gear mechanism having two input shafts and an output shaft, means for coupling said output shaft of said electric motor to one of said input shafts of said gear mechanism, and means interconnecting the other input shaft of said gear mechanism to said means for energizing said first receiver in a manner to rotate said other input shaft as a function of the unstretched length of cable fed to said well.

References Cited in the file of this patent

UNITED STATES PATENTS

| | | |
|---|---|---|
| 2,326,219 | Hayward | Aug. 10, 1943 |
| 2,794,951 | Broding et al. | June 4, 1957 |
| 2,934,695 | Maulsby | Apr. 26, 1960 |